United States Patent
Obermüller et al.

(10) Patent No.: US 11,370,484 B2
(45) Date of Patent: Jun. 28, 2022

(54) METHOD AND STEERING SYSTEM FOR STEERING A VEHICLE

(71) Applicant: AUDI AG, Ingolstadt (DE)

(72) Inventors: Anton Obermüller, Ingolstadt (DE); Adrian Mihailescu, Ingolstadt (DE); Ferdinand Hartinger, Munich (DE); Klaus Diepold, Kissing (DE); Martin Enning, Ingolstadt (DE); Christian Wiedenmann, Ingolstadt (DE); Michael Ortlechner, Ingolstadt (DE); Matthias Lehmann, Freising (DE)

(73) Assignee: AUDI AG, Ingolstadt (DE)

( * ) Notice: Subject to any disclaimer, the term of this patent is extended or adjusted under 35 U.S.C. 154(b) by 506 days.

(21) Appl. No.: 16/191,651

(22) Filed: Nov. 15, 2018

(65) Prior Publication Data
US 2019/0152520 A1   May 23, 2019

(30) Foreign Application Priority Data
Nov. 22, 2017   (DE) ...................... 10 2017 220 875.9

(51) Int. Cl.
*B62D 7/15* (2006.01)
*B62D 5/00* (2006.01)
(Continued)

(52) U.S. Cl.
CPC ............ *B62D 7/159* (2013.01); *B62D 5/008* (2013.01); *B62D 6/02* (2013.01); *B62D 15/0235* (2013.01); *B62D 6/002* (2013.01)

(58) Field of Classification Search
CPC .......... B62D 7/159; B62D 5/008; B62D 6/02; B62D 6/002; B62D 15/0235
See application file for complete search history.

(56) References Cited

U.S. PATENT DOCUMENTS

| | | | |
|---|---|---|---|
| 2010/0025144 A1* | 2/2010 | Huang ................... | B62D 5/008 180/401 |
| 2013/0096778 A1 | 4/2013 | Goto et al. | |

FOREIGN PATENT DOCUMENTS

| | | |
|---|---|---|
| CN | 1718491 A | 1/2006 |
| CN | 101239625 A | 8/2008 |
| (Continued) | | |

OTHER PUBLICATIONS

Office Action dated Nov. 13, 2019, in corresponding Korean Application No. 10-2018-143331; 13 pages.
(Continued)

*Primary Examiner* — Alan D Hutchinson
(74) *Attorney, Agent, or Firm* — Maier & Maier, PLLC

(57) ABSTRACT

A method for steering a vehicle that comprises a steering system with a steering wheel and a front axle as well as a rear axle with wheels, wherein it is provided that a direction of the vehicle is adjusted manually by a driver of the vehicle by adjustment of a steering wheel angle of the steering wheel, as a result of which, for the wheels of at least one of the axles, a steering angle is adjusted, which is obtained from the steering wheel angle plus a superposition angle, wherein, through an automatically adjustable steering ratio for the wheels of at least one of the axles, a ratio of the steering wheel angle to the steering angle for the wheels is set, wherein the vehicle travels into a curve on a circular path with a radius at a speed with a first value, wherein a steering wheel angle is adjusted by the driver.

9 Claims, 1 Drawing Sheet

(51) Int. Cl.
*B62D 6/02* (2006.01)
*B62D 15/02* (2006.01)
*B62D 6/00* (2006.01)

(56) References Cited

FOREIGN PATENT DOCUMENTS

| | | | |
|---|---|---|---|
| CN | 104364139 A | 2/2015 | |
| CN | 106064639 A | 11/2016 | |
| DE | 10 2006 017 406 A1 | 10/2007 | |
| DE | 10 2007 000 975 A1 | 5/2009 | |
| DE | 10 2007 053 818 A1 | 5/2009 | |
| DE | 102007000975 A1 * | 5/2009 | ............ B62D 6/001 |
| DE | 10 2008 012 006 A1 | 9/2009 | |
| DE | 10 2011 007 263 A1 | 10/2012 | |
| DE | 10 2012 009568 B3 | 5/2013 | |
| JP | 2011-207310 A | 10/2011 | |
| WO | 2011/155637 A1 | 12/2011 | |

OTHER PUBLICATIONS

The extended European search report dated Apr. 12, 2019 of corresponding European application No. 18203029.6 including partial machine-generated English language translation; 12 pages.

Chinese Office Action dated Nov. 30, 2020, in connection with corresponding CN Application No. 201811391000.3 (20 pp., including machine-generated English translation).

Chinese Office Action dated Mar. 11, 2021, in connection with corresponding CN Application No. 201811391000.3 (7 pp., including machine-generated English translation).

\* cited by examiner

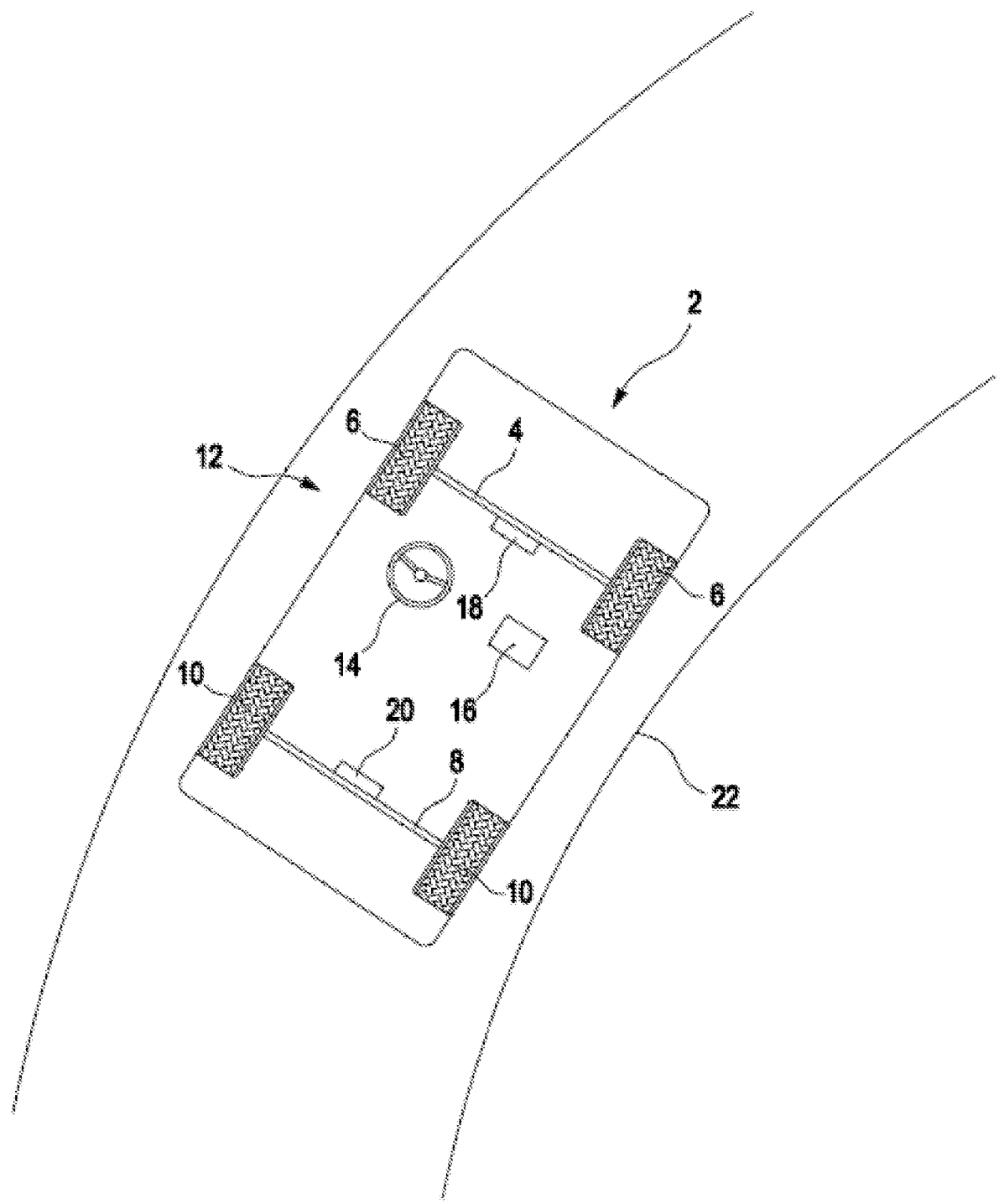

METHOD AND STEERING SYSTEM FOR STEERING A VEHICLE

FIELD

The invention relates to a method for steering a vehicle and a steering system for steering a vehicle.

BACKGROUND

In order to optimize the driving response of a vehicle, the vehicle is often equipped with a steerable rear axle and/or a superimposed steering system for a front axle. It is possible therewith to make the vehicle agile or to stabilize it, depending on the situation, and to configure a steering ratio in a variable manner. The steering ratios of the front and rear axles, that is, the ratio of a steering wheel angle to a respective wheel steering angle being adjusted at the front and rear axle, affect a steering effort, that is, the ratio between the steering wheel angle and an adjusting curve radius.

During travel into a curve or cornering, the curve radius can undesirably change while the steering wheel angle remains constant and can compel the driver to correct the steering wheel angle, that is, to turn inward by reducing the steering wheel angle or to turn outward by increasing the steering wheel angle. This is due to the fact that an applied steering effort is variably dependent on the speed, wherein the steering effort is greater at higher speed and less at lower speed. If the steering effort is less, for example, then the driver has to turn outward in order to maintain a desired curve radius. Based on physical circumstances, the steering effort varies in relation to the speed of the vehicle even without rear-axle steering and superimposed steering, because, for example, a change in a self-steering gradient ensues through a change in a lateral acceleration of the vehicle. This leads to the circumstance that the steering effort is reduced when the vehicle slows down and, in this case, the driver has to turn outward in order to maintain the desired curve radius.

The publication DE 10 2006 017 406 A1 describes a method for operating a steering system of a motor vehicle, in which, with a steering control, a steering wheel angle is specified as a measure for a desired wheel steering angle for at least one steerable wheel of the motor vehicle.

A method for operating a superimposed steering system is presented in the publication DE 10 2007 000 975 A1. In the method, it is possible to take into consideration a driving speed in determining a steering ratio, so that the steering ratio is changed as a function of the driving speed.

The publication DE 10 2007 053 818 A1 describes a method for the operation of a vehicle steering device with a variable ratio. In this case, a specified steering angle and a setting angle that is actually to be adjusted are determined and a compatibility of the setting angle with the steering angle is checked.

SUMMARY

Against this background, an object was to minimize a steering effort for a vehicle during travel through a curve.

The method according to the invention is designed for steering a vehicle, such as, for example, a motor vehicle that has a steering system with a steering wheel and a front axle and a rear axle with wheels. In this case, a driver of the vehicle adjusts a direction of the vehicle by manually adjusting a steering wheel angle of the steering wheel, as a result of which and/or wherein a steering angle is adjusted automatically by the steering system for the wheels of at least one of the axles, said steering angle being obtained from the steering wheel angle plus a superposition angle. In addition, a ratio of the steering wheel angle to the steering angle for the wheels is fixed by an automatically adjustable steering ratio for the wheels of at least one of the axles. In the method, the vehicle is driven at a speed with a first value into a curve along a circular path with a radius, wherein a steering wheel angle is adjusted by the driver. Taking into consideration a characteristic curve for a relation of the superposition angle and the speed, in this case, the steering system automatically adjusts a superposition angle that is dependent on the first value of the speed.

In the method, furthermore, at least one of two possible cases is taken into consideration and/or carried out, wherein, in both possible cases, the steering wheel angle is initially held constant and stays unchanged. In a first case, the superposition angle and the steering ratio are kept constant by the steering system. Alternatively or additionally, in a second case, the steering ratio is automatically changed by the steering system as a function of the speed, and the radius of the circular path and, accordingly, the steering effort are kept constant.

In one embodiment, in the first case, the steering ratio and thus the superposition angle are kept constant until the driver changes the steering wheel angle. Moreover, in the first case, it is possible for the radius of the circular path to be adapted by additional adjustment of the superposition angle when the driver changes the steering wheel angle. In the second case, it is also possible for the steering wheel angle to be held constant.

In the second case, the radius of the circular path on and/or along which the vehicle travels through the curve is adapted by additional adjustment of the superposition angle in such a way that, when the steering wheel angle is held constant, the steering effort, that is, the ratio between the steering wheel angle and the curve radius, is constant. This means that the steering ratio is automatically changed, so that, as a consequence thereof or subsequently, the steering wheel angle can be held constant.

In the first case, the steering ratio stays constant as long as the steering wheel angle that is adjusted by the driver when traveling into the curve stays constant and thus remains the same or unchanged. In contrast, in the first case, the steering ratio is changed or altered when, starting from a steering wheel angle that was already or initially adjusted during travel into the curve, the steering wheel angle is additionally altered by the driver, with the radius of the circular path staying nearly constant. As a result, in the second case, the steering effort stays constant.

Provided that, in the second case, the steering wheel angle adjusted by the driver is maintained, the superposition angle and thus the steering angle for the wheels of the at least one axle are altered in accordance with a change in the steering ratio that was adjusted and/or is to be adjusted to the value of the speed, for example. In this way, it is possible for the radius of the curve path to stay the same or constant.

If, in the second case, the steering wheel angle adjusted by the driver when traveling into the curve is further altered, then the steering ratio is automatically further changed, taking into consideration, for example, a functional dependence of the superposition angle and/or the steering ratio on the speed, and, in consequence thereof, the steering wheel angle is held constant.

It is provided that the vehicle travels with the first value of the speed and a direction of the vehicle is altered through adjustment of the steering wheel angle by the driver during travel into the curve. In this case, it is possible that, starting from the first value, the speed changes to a second value—for example, it is reduced during braking or increased during acceleration. If the speed of the vehicle is changed in the first case and/or in the second case, the steering ratio is automatically changed in the second case, taking into consideration a functional dependence of the steering ratio on the current speed and/or on a change in the current speed, whereas, in the first case, it is kept constant as long as the steering wheel angle is held constant (by the driver). In the second case, however, the steering ratio is adapted in such a way that, taking into consideration the functional dependence of the steering ratio on the speed, and in contrast to an adjustment of the steering ratio provided in accordance with the prior art, the steering effort stays constant; that is, when the steering wheel angle is constant, the curve radius is also kept constant through compensation of the physical forces acting during travel along a curve by the steering ratio that is adjusted automatically in accordance with the invention. Accordingly, to the greatest possible extent, the driver does not need to make any change in the steering wheel angle in order to compensate for the acting physical forces and is thereby relieved.

In one embodiment, for adjustment of the steering angle, the superposition angle, which is dependent on the first value of the speed, is added to the steering wheel angle, wherein it is possible for the superposition angle to have a positive value or a negative value depending on the characteristic curve that describes the dependence of the superposition angle on the speed.

Usually, the method is carried out by the driver only during and/or on the basis of a change in the steering wheel angle, that is, in particular, during travel into a curve or during travel on a stretch of roadway that is curved at least in its course.

The manually altered steering wheel angle that is currently adjusted in each case by the driver—for example, also by turning the steering wheel—is maintained, and the steering angle for the wheels of the at least one axle is initially changed in accordance with the provided superposition angle and/or a change in the steering ratio adjusted to the speed, wherein the steering angle is adjusted by also adapting the steering ratio and/or the superposition angle to the changed speed. In this case, it is also possible for the steering wheel angle to be changed by the driver, that is, only by the driver, but not by the steering system. In accordance therewith, the driver does not feel, at least not manually, any change in the steering angle by the superposition angle, because only the superposition angle is adapted, whereas a steering wheel angle that has been currently adjusted by the driver in each case is not influenced in the method. When the steering wheel angle is altered by the driver, the steering ratio is dynamically changed and adapted. The method is accordingly set by the driver in the case of a constant steering wheel angle, which is then adjusted, at least for changing direction, initially to an angular position that differs from 0°, that is, is greater than or less than 0°, and with changing speed, wherein, in the scope of the method, the superposition angle and thus the steering angle are adapted to the steering wheel angle that is adjusted in each case, wherein, in the first case, the superposition angle is adapted to the steering wheel angle, which is initially adjusted and then held constant, and to the prevailing speed during adjustment of the steering wheel angle, and then, regardless of the speed, held constant until the steering wheel angle is altered by the driver, and wherein, in the second case, the superposition angle is adapted, depending on the speed, in such a way that the curve radius stays constant, and, accordingly, for a steering wheel angle that remains constant, the steering effort also stays constant.

The method is carried out during cornering—for example, during travel into a curve and/or during travel through a curve—when the steering wheel angle is adjusted by the driver to differ from 0° and/or is altered starting from a steering angle of 0°, for example. For a curve of this kind, depending on the definition, when the steering wheel angle adjusted by the driver is greater than or less than 0° and/or is altered, the direction of the vehicle is also changed in comparison to travel in a straight line. During travel in a straight line, in contrast to cornering, the steering wheel angle is adjusted, depending on the definition, to the value 0° and is maintained constant. Accordingly, the steering angle for the wheels of at least one of the axles is adjusted to the value 0°.

For changing the direction of the vehicle, the steering wheel angle is adjusted and/or altered by the driver usually to a value different from 0°. The steering angle for the wheels of the at least one axle ensues from the steering ratio that is adjusted in each case, which defines the ratio of the steering wheel angle to the steering angle, with the steering angle being obtained from the steering wheel angle plus the superposition angle. If the steering wheel angle will be and/or is adjusted to the value 0°, also the respective steering angle and thus the superposition angle will be and/or are adjusted to the value 0°, for which reason the vehicle then carries out travel in a straight line. The value of the steering wheel angle and of the steering angle for the wheels of the at least one axle resulting from it, taking into consideration the superposition angle, describes, in each case, a deviation from the value of 0° for the steering wheel angle, the superposition angle, and thus the steering angle of the at least one axle in the case of travel in a straight line.

Through changing or adapting the steering ratio for the wheels of the at least one axle, a steering ratio for the wheels of the front axle and/or a steering ratio for the wheels of the rear axle is or are automatically altered as a function of the change in the current speed. Moreover, depending on the manually adjusted steering wheel angle as well as the steering ratio and/or the superposition angle, which is or are adapted to the speed, the steering angle is also automatically adapted to the speed, that is, it is changed or adjusted. In this case, the superposition angle is adjusted depending on a difference between the first value and the second value of the speed, for example.

In the second case, a steering ratio for the wheels of the front axle and/or a steering ratio for the wheels of the rear axle is or are automatically altered, depending on a change in the speed of the vehicle, from the first value to a current second value, for example, with the steering wheel angle and the steering effort being maintained.

In embodiment, for the case that the speed is reduced by braking, the steering ratio is reduced and, as a result thereof, the steering angle is automatically increased on account of an increase in the superposition angle. Alternatively or additionally, for the case that the speed is increased by acceleration, the steering ratio is increased, and, as a result thereof, the steering angle is automatically reduced on account of a reduction in the superposition angle.

In embodiment, the steering ratio is altered, taking into consideration a functional dependence of the steering ratio on the speed that is proportional to at least one power of the speed, such as, for example, proportional to the speed and/or proportional to a square of the speed. If the functional dependence of the steering ratio on the speed corresponds to an nth degree polynomial, then the steering ratio is adjusted for a change in the speed in accordance with this nth degree polynomial.

In embodiment, the steering ratio is automatically changed and thus adapted, with maintenance of the steering wheel angle, in accordance with a change in the speed.

When the vehicle travels into the curve and/or through the curve, a currently adjusted front steering ratio between the steering wheel angle of the steering wheel and the steering angle of the wheels of the front axle and/or a currently adjusted rear steering ratio between the steering wheel angle of the steering wheel and the steering angle of the wheels of the rear axle is or are determined. The speed of the vehicle is also determined, with the front steering ratio and the rear steering ratio being adapted to the speed.

The speed is adjusted by the driver through actuation of at least one speed setting element, such as, for example, an acceleration pedal and/or a braking pedal, and changed by altering the actuation or by applying the at least one speed setting element; that is, for example, the speed is increased by acceleration or decreased by braking. However, in the first case, when there is a further change in the speed, the steering ratio is kept constant here; that is, the superposition angle and the steering angle remain unchanged as long as the driver maintains the steering wheel angle.

The steering wheel system according to the invention is designed for steering a vehicle that has a steering wheel and a front axle as well as a rear axle with wheels. The steering system comprises the steering wheel, and, in embodiment, depending on the definition each time, a control device. Depending on a steering wheel angle that can be adjusted or is to be adjusted manually for the steering wheel by a driver of the vehicle, and depending on a steering ratio that is automatically adjustable by the control device for wheels of at least one of the axles, a steering angle can be adjusted or is to be adjusted, with the steering ratio fixing and/or defining a ratio of the steering wheel angle to the steering angle. Moreover, the steering angle is obtained from the steering wheel angle plus a superposition angle. It is provided that, in one situation, the vehicle travels at a speed with a first value into a curve on a circular path with a radius, wherein a steering wheel angle is adjusted by the driver. Taking into consideration a characteristic curve for a relationship of the superposition angle and a change in the speed, the steering system is designed for the purpose of automatically adjusting a superposition angle that is dependent on the first value of the speed. The steering system is designed to take into consideration and/or to carry out at least one of two possible cases. When the steering wheel angle is held constant, in a first case, the steering system is designed to keep constant the superposition angle and the steering ratio and/or, in a second case, automatically to alter the steering ratio depending on the speed and to keep constant the radius of the circular path.

In the first case, for example, it is provided that the steering ratio is kept constant in that the superposition angle is kept constant as long as the steering wheel angle remains constant. Only when the steering wheel angle is changed by the driver for compensation of the physical forces acting on the curve radius is the steering angle or the superposition angle changed. Alternatively or additionally, in a second case, the steering system is designed to change the steering ratio automatically and continuously, and, accordingly, to counter dynamically the acting physical forces, and, in this case, as a consequence thereof or subsequently, to keep constant the steering wheel angle.

In embodiment, the steering system has at least one actuator, which is associated with at least one of the axles and is designed for the purpose of adjusting the steering angle for the wheels of the at least one axle, taking into consideration the manually adjustable steering wheel angle and the automatically adjustable steering ratio.

With the method, it is possible to change, to minimize, or even to suppress the steering of the vehicle during cornering, that is, during travel into and/or through the curve, when the direction of the vehicle changes.

When the vehicle is being steered, a steering effort by the driver is required, with the steering effort describing a ratio between the steering wheel angle and an adjusting radius of the circular path (curve radius) on/or along which the vehicle travels through the curve. Furthermore, a change in the steering ratio at least at one axle, such as, for example, a steering ratio of the front axle and/or the rear axle, is permitted in the first case only when the steering wheel angle is changed by the driver. In the second case, through adaptation of at least one steering ratio, such as, for example, the steering ratios for both axles, a steering effort due to the physical parameter that is to be taken into consideration, which influences the travel of the vehicle into and/or through the curve, remains unchanged. As a result of this, during a deceleration operation or an acceleration operation, the steering effort stays the same with a steering wheel angle that remains the same.

The individual steering ratio for a particular axle, that is, for the front axle and the rear axle, is obtained from a ratio of the steering wheel angle to a steering angle or wheel steering angle of at least one wheel—as a rule, both wheels—of a particular axle. A total steering effort is obtained from the ratio of the steering wheel angle to the resulting radius of the circular path that is provided for the vehicle during travel into and/or through the curve. This steering effort stays the same. Taken into consideration for this are, at least indirectly, the individual steering ratios of the front and rear axles as well as at least one further parameter of the vehicle, such as, for example, the wheelbase.

In the scope of the method, in the second case, the following formulas (1) and (2) are used, by means of which it is calculated how the steering angle is adapted by adjusting the superposition angle of the front axle when the vehicle is braked with a position of the steering wheel that remains the same, and, accordingly, with a steering wheel angle also remaining the same during travel into the curve and/or through the curve, with there being no change in the radius of the circular path on which the vehicle is situated and/or that describes said circular path.

In this case, the two formulas (1) and (2) comprise the following physical parameters of the vehicle:
$d\_v$=steering angle of the front axle,
$d\_h$=steering angle of the rear axle,
$l$=wheelbase,
$R$=radius of the circular path that results when the vehicle travels into and/or through the curve,
$m\_v$=axial load of the front axle,
$m\_h$=axial load of the rear axle,
$v$=speed of the vehicle,
$c\_v$=slip resistance of the wheels of the front axle,
$c\_h$=slip resistance of the wheels of the rear axle.

In accordance therewith, the steering wheel angle $w\_lr$, which is a function of a position of the steering wheel, the steering angle $d\_v$ of the front axle, and the steering angle $d\_h$ of the rear axle are taken into consideration. The front steering angle $d\_v$ is obtained from the steering wheel angle w_lr plus a superposition angle, with it being possible for a front superposition angle to be provided for the wheels of the front axle. In this case, for the wheels of the front axle, a dynamic steering is implemented, with the front steering angle d_v being adjusted by the control device of the steering system, from the respectively adjusted steering wheel angle w_lr, for example, taking into consideration the superposition angle. The rear steering wheel angle d_v is adjusted by the control device of the steering system. The superposition angle is a function of the speed v and the radius R of the circular path. A particular steering ratio is obtained from the steering wheel angle w_lr through a steering angle d_v, d_h of a particular axle, that is, a front steering ratio Lü_v=w_lr/d_v and a rear steering ratio Lü_h=w_lr/d_h. A steering effort L_a=w_lr/R is obtained from a ratio of the steering wheel angle w_lr to the radius R.

$$d\_v = I/R + (m\_v/c\_v - m\_h/c\_h)*v^2/R + d\_h \quad (1)$$

Now, if, with a constant steering wheel angle, braking occurs into the curve or during travel in the curve and the speed v is reduced, then the parameters I, R, m_v, c_v, m_h, c_h, and d_h remain unchanged. The steering angle d_v of the front axle or of the front wheels is obtained from the change in the speed v or from a square $v^2$ of the speed.

In addition, the following applies: Now, if, with a constant steering wheel angle, acceleration occurs out of a curve or during travel in the curve and the speed v is increased, then the parameters I, R, m_v, c_v, m_h, c_h, and d_h remain unchanged. The steering angle d_v of the front axle or of the front wheels is obtained from the change in the speed v or from a square $v^2$ of the speed.

$$d\_h = -I/R - (m\_v/c\_v - m\_h/c\_h)*v^2/R + d\_v \quad (2)$$

If, with a constant steering wheel angle, braking occurs into the curve or during travel in the curve and the speed v is reduced, then the parameters I, R, m_v, c_v, m_h, c_h, and d_v remain the same. The steering angle d_h of the rear axle or of the rear wheels is obtained from the change in the speed v or from the square $v^2$ thereof.

In addition, the following applies: Now, if, with a constant steering wheel angle, acceleration occurs out of a curve or during travel in the curve and the speed v is increased, then the parameters I, R, m_v, c_v, m_h, c_h, and d_v remain unchanged. The steering angle d_h of the rear axle or of the rear wheels is obtained from the change in the speed v or from a square $v^2$ of the speed.

Furthermore, it is possible to take into consideration a centrifugal force $F\_z = m*v^2/R$, which acts on the vehicle with a total mass m during travel at the speed v along a curve on the curve path with the radius R. In this case, it is possible for a respective steering ratio Lü_v, Lü_h and/or the steering effort L_a to be proportional to the centrifugal force F_z. In embodiment, the steering system of the vehicle comprises, among other things, the steerable rear axle and/or a superimposed steering system for the front axle, with which the vehicle is made agile and/or is stabilized, depending on the situation, and the steering ratio is variably designed. It is further taken into consideration that the steering ratios of the front and rear axles, that is, the ratio of the steering wheel angle to the steering angles or wheel steering angles being adjusted at the front and rear axles, affect the steering effort, that is, the ratio between the steering wheel angle and the adjusting radius of the circular path that the vehicle follows. The steering ratios are a function of the speed, for which reason, in the second case, these steering ratios are varied in the case of a changing speed.

If, for example, the driver brakes the vehicle at a steering wheel angle that remains the same during travel into the curve, the speed of the vehicle is reduced. Moreover, in the second case, the steering ratio for the at least one axle is reduced. In this case, the radius of the circular path provided for the vehicle into and/or through the curve remains unchanged when the steering wheel angle remains the same, with the driver not being compelled to correct the steering wheel angle, because, on account of the change or adaption of the steering ratio, the steering angle is also automatically adapted. When the method is carried out, the applied steering effort also stays constant or remains unchanged, maintaining the radius of the circular path.

Further advantages and embodiments of the invention ensue from the description and the appended drawing.

It is understood that the previously mentioned features and the features that will be explained below can be used not only in the respectively given combination, but also in other combinations or alone, without departing from the scope of the present invention.

BRIEF DESCRIPTION OF THE DRAWING

The invention is illustrated schematically on the basis of embodiments in the drawing and will be described schematically and in detail with reference to the drawing.

FIG. 1 shows, in schematic illustration, a vehicle, which has an embodiment of the steering system according to the invention, when an embodiment of the method according to the invention is carried out.

DETAILED DESCRIPTION

The vehicle 2 shown schematically in FIG. 1 comprises a front axle 4 with front wheels 6 and a rear axle 8 with rear wheels 10. The embodiment of the steering system 12 has a steering wheel 14, a front actuator 18 for adjusting a steering angle as a parameter of the wheels 6 of the front axle 4, a rear actuator 20 for adjusting a steering angle as a parameter of the wheels 10 of the rear axle 4, and a control device 16.

A direction of the vehicle 2 is influenced by a driver of the vehicle 2 by controlling the steering wheel 14, with a steering wheel angle of the steering wheel 14 being adjusted—for example, altered—as a parameter of the vehicle 2. Starting from the respectively currently adjusted steering wheel angle of the steering wheel 14, the actuators 18, 20 are controlled by the control device 16, as a result of which, in turn, the axles 4, 8 and wheels 6, 10 arranged on them are steered. In this case, a front steering angle is adjusted for the wheels 6 of the front axle 4 through a front steering ratio that is adjusted by the control device 16 and a rear steering angle is adjusted for the wheels 10 of the rear axle 8 through a rear steering ratio that is adjusted by the control device 16. In this case, through the particular steering ratio that is automatically adjusted and can be changed by the control device 16, a provided ratio of the steering wheel angle to the steering angle of the particular axle 4, 8 is fixed or defined. If the vehicle 2 travels into and/or through a curve 22, the vehicle 2 moves on a circular path, which has a radius or can be defined by the radius. In this case, the steering angle is obtained from the steering wheel angle plus a superposition angle, which, taking into consideration a characteristic curve, is a function of the speed of the vehicle and the radius of the circular path that the vehicle describes in the curve 22.

In the embodiment of the method for steering a vehicle 2, it is provided that, during travel along a curve, a direction of the vehicle 2 is changed by the curve 22, with the steering wheel angle and at least one steering angle that results based on a particular steering ratio and a superposition angle for the wheels 6, 10 of the at least one axle 4, 8 differing from 0° or being greater than or less than 0° and/or being altered. Furthermore, in this case, a particular steering angle is automatically adapted to the speed on the basis of the adaptation to the changed speed.

If, during travel along a curve with a change in direction of the vehicle 2, the speed of the vehicle 2 is further changed, the steering ratio is also automatically changed, taking into consideration a functional dependence of the steering ratio on the speed, and is usually reduced during braking of the vehicle 2 and increased during acceleration of the vehicle 2, but with the superposition angle being dynamically adapted in such a way that the steering effort stays constant. On account thereof, the steering angle is increased during braking and is automatically reduced during acceleration, without it being necessary for the driver to turn inward or outward.

Here, in a first case, the steering ratio is kept constant, wherein the steering ratio is changed only when the steering wheel angle is changed. In a second case, the steering ratio is automatically altered and the steering wheel angle is held constant.

The invention claimed is:

1. A method for steering a vehicle that comprises a steering system with a steering wheel and a front axle as well as a rear axle with wheels, the method comprising:
   adjusting a direction of the vehicle is manually by a driver of the vehicle by adjustment of a steering wheel angle of the steering wheel, as a result of which, for the wheels of at least one of the axles, a steering angle is adjusted, which is obtained from the steering wheel angle plus a superposition angle;
   setting a ratio of the steering wheel angle to the steering angle for the wheels through an automatically adjustable steering ratio for wheels of at least one of the axles, wherein the vehicle travels at a speed with a first value into a curve on a circular path with a radius;
   adjusting a superposition angle that is a function of the first value of the speed automatically by a steering system, taking into consideration a characteristic curve for a relation between the superposition angle and the speed; and
   changing the steering ratio automatically by the steering system as a function of the speed, while the radius of the circular path is kept constant.

2. The method according to claim 1, further comprising:
   adjusting the superposition angle automatically while the steering wheel angle is held constant.

3. The method according to claim 1, further comprising:
   altering the steering ratio when the steering wheel angle is altered by the driver, while the radius of the circular path remains constant.

4. The method according to claim 1, further comprising:
   altering the superposition angle for the wheels of the at least one axle in accordance with a change in the steering ratio.

5. The method according to claim 1, further comprising:
   reducing the speed from the first value to a second value.

6. The method according to claim 1, further comprising:
   changing at least one of a steering ratio for the wheels of the front axle and a steering ratio for the wheels of the rear axle depending on a change in the steering wheel angle.

7. The method according to claim 1, further comprising:
   changing the steering ratio in proportion to a change in the speed.

8. A steering system for steering a vehicle comprising:
   a steering wheel;
   a front axle; and
   a rear axle with wheels, wherein a direction of the vehicle can be adjusted manually by a driver of the vehicle by adjusting a steering wheel angle of the steering wheel, the steering system is configured to
   adjust a steering angle for the wheels of at least one of the axles depending on the adjusted steering wheel angle, said steering angle being obtained from the steering wheel angle plus a superposition angle,
   adjust a steering ratio automatically for the wheels of at least one of the axles to set a ratio of the steering wheel angle to the steering angle for the wheels, wherein, when the vehicle travels into a curve on a circular path with a radius at a speed with a first value and a steering wheel angle is adjusted by the driver, taking into consideration a characteristic curve for a relation between the superposition angle and the speed,
   adjust a superposition angle that is a function of the first value of the speed automatically, and
   change the steering ratio as a function of the speed automatically, while keeping the radius of the circular path constant.

9. A steering system according to claim 8, further comprising:
   at least one actuator, which is associated with at least one axle and is configured to automatically adjust the steering angle for the wheels of the at least one axle, taking into consideration the manually adjustable steering wheel angle and the automatically adjustable steering ratio.

* * * * *